United States Patent
Raab et al.

(10) Patent No.: US 12,398,686 B2
(45) Date of Patent: Aug. 26, 2025

(54) INJECTOR FOR INTRODUCING, IN PARTICULAR FOR DIRECTLY INJECTING GASEOUS FUEL INTO A COMBUSTION CHAMBER OF AN INTERNAL COMBUSTION CHAMBER, AND GAS ENGINE

(71) Applicant: Daimler Truck AG, Leinfelden-Echterdingen (DE)

(72) Inventors: Alois Raab, Boebingen (DE); Felix Christian Rosenthal, Schorndorf (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 50 days.

(21) Appl. No.: 18/254,824

(22) PCT Filed: Sep. 29, 2021

(86) PCT No.: PCT/EP2021/076750
§ 371 (c)(1),
(2) Date: May 26, 2023

(87) PCT Pub. No.: WO2022/111886
PCT Pub. Date: Jun. 2, 2022

(65) Prior Publication Data
US 2024/0035431 A1    Feb. 1, 2024

(30) Foreign Application Priority Data
Nov. 30, 2020   (DE) .................... 10 2020 007 299.2

(51) Int. Cl.
*F02M 21/02*        (2006.01)
(52) U.S. Cl.
CPC .... *F02M 21/0269* (2013.01); *F02M 21/0275* (2013.01); *F02M 21/0254* (2013.01)

(58) Field of Classification Search
CPC .......... F02M 21/0269; F02M 21/0275; F02M 21/0254
(Continued)

(56) References Cited

U.S. PATENT DOCUMENTS

| | | | | |
|---|---|---|---|---|
| 5,106,023 A * | 4/1992 | Bentley | ................. | F02M 61/08 239/533.2 |
| 6,189,816 B1 * | 2/2001 | Stier | .................... | F02M 61/168 29/890.132 |

(Continued)

FOREIGN PATENT DOCUMENTS

| | | |
|---|---|---|
| DE | 100 20 719 A1 | 2/2001 |
| DE | 10 2014 212 339 A1 | 12/2015 |

(Continued)

OTHER PUBLICATIONS

PCT/EP2021/076750, International Search Report dated Dec. 13, 2021 (Two (2) pages).

(Continued)

*Primary Examiner* — Logan M Kraft
*Assistant Examiner* — John D Bailey
(74) *Attorney, Agent, or Firm* — Crowell & Moring LLP

(57) ABSTRACT

An injector for introducing a gaseous fuel into a combustion chamber. A housing has an outflow opening that can be flowed through by the gaseous fuel. A valve element can be moved between a closed position in which the valve element sits on a valve seat to separate a first housing region from a second housing region and an open position in which the valve element is spaced apart from the valve seat. When moved out of the closed position into the open position, the valve element can be moved into the second housing region. The valve element has a valve body region that is disposed in the second housing region in both the closed position and the open position. The valve body region is domed at least (Continued)

in a partial region of the valve body region and/or is tapered in a direction pointing away from the valve seat.

10 Claims, 4 Drawing Sheets

(58) Field of Classification Search
USPC .................................................. 239/533.2
See application file for complete search history.

(56) References Cited

U.S. PATENT DOCUMENTS

| | | | | |
|---|---|---|---|---|
| 6,422,488 | B1* | 7/2002 | Fochtman | F02M 51/0664 |
| | | | | 239/585.5 |
| 6,454,189 | B1* | 9/2002 | Krishnamurthy | F02M 47/027 |
| | | | | 239/533.2 |
| 6,508,418 | B1* | 1/2003 | Fochtman | F02M 21/0266 |
| | | | | 239/585.4 |
| 6,530,273 | B1* | 3/2003 | Gottlieb | F02M 61/16 |
| | | | | 222/509 |
| 6,779,743 | B2* | 8/2004 | Kitamura | F02M 61/18 |
| | | | | 239/596 |
| 6,851,630 | B2* | 2/2005 | Nagaoka | F02M 51/0614 |
| | | | | 239/585.4 |
| 7,011,257 | B2* | 3/2006 | Heyse | F02M 51/0671 |
| | | | | 239/533.13 |
| 7,871,021 | B2* | 1/2011 | Cooke | F02M 61/1813 |
| | | | | 239/584 |
| 8,657,213 | B2* | 2/2014 | Sakata | F02M 61/1853 |
| | | | | 239/596 |
| 2001/0017327 | A1* | 8/2001 | Fochtman | F02M 51/0671 |
| | | | | 239/585.4 |
| 2001/0019084 | A1* | 9/2001 | Cohen | F02M 21/0266 |
| | | | | 239/585.4 |
| 2001/0032612 | A1* | 10/2001 | Welch | F02D 41/20 |
| | | | | 123/294 |
| 2002/0002962 | A1* | 1/2002 | Ibrahim | F02B 19/12 |
| | | | | 123/276 |
| 2003/0132323 | A1* | 7/2003 | Ismailov | F02M 63/00 |
| | | | | 239/585.5 |
| 2004/0129804 | A1* | 7/2004 | Potz | F02M 47/027 |
| | | | | 239/533.2 |
| 2005/0145713 | A1* | 7/2005 | Reiter | F02M 61/08 |
| | | | | 239/533.2 |
| 2006/0043220 | A1* | 3/2006 | Leroux | F02M 21/0254 |
| | | | | 239/585.1 |
| 2009/0090794 | A1* | 4/2009 | Hung | F02M 61/1806 |
| | | | | 239/533.2 |
| 2011/0233308 | A1* | 9/2011 | McAlister | F02M 21/0206 |
| | | | | 239/533.2 |
| 2012/0318892 | A1* | 12/2012 | Reiter | F02M 61/168 |
| | | | | 239/533.2 |
| 2013/0062442 | A1* | 3/2013 | Czimmek | F02M 21/0254 |
| | | | | 239/585.1 |
| 2014/0224903 | A1* | 8/2014 | Fujino | F02M 51/0682 |
| | | | | 239/584 |
| 2015/0115055 | A1* | 4/2015 | Wager | F02M 43/04 |
| | | | | 239/584 |
| 2015/0267631 | A1* | 9/2015 | Miyamoto | F02M 21/0284 |
| | | | | 123/445 |
| 2015/0267659 | A1* | 9/2015 | Jaegle | F02M 51/061 |
| | | | | 239/585.5 |
| 2015/0377185 | A1* | 12/2015 | Schmieder | F02M 21/0269 |
| | | | | 123/294 |
| 2016/0245151 | A1* | 8/2016 | Yuuki | F02B 19/08 |
| 2016/0252005 | A1* | 9/2016 | Jacob | F02M 21/0269 |
| | | | | 137/537 |
| 2016/0252006 | A1* | 9/2016 | Jacob | F02M 21/0242 |
| | | | | 123/266 |
| 2016/0252045 | A1* | 9/2016 | Jacob | F02M 21/0242 |
| | | | | 123/260 |
| 2017/0321636 | A1* | 11/2017 | Moser | F02M 21/0275 |
| 2018/0363591 | A1* | 12/2018 | Etcheverry | F02M 21/0275 |

FOREIGN PATENT DOCUMENTS

| | | |
|---|---|---|
| DE | 10 2014 224 344 A1 | 6/2016 |
| DE | 10 2017 213 737 A1 | 2/2019 |
| DE | 10 2017 219 932 A1 | 5/2019 |
| DE | 10 2018 211 401 A1 | 1/2020 |
| EP | 1 195 203 A2 | 4/2002 |
| EP | 3 015 699 A1 | 5/2016 |

OTHER PUBLICATIONS

German-language German Office Action issued in German application No. 10 2020 007 299.2 dated Sep. 30, 2021 (Six (6) pages).
German-language German Office Action issued in German application No. 10 2020 007 299.2 dated Feb. 21, 2022 (Four (4) pages).

* cited by examiner

INJECTOR FOR INTRODUCING, IN PARTICULAR FOR DIRECTLY INJECTING GASEOUS FUEL INTO A COMBUSTION CHAMBER OF AN INTERNAL COMBUSTION CHAMBER, AND GAS ENGINE

BACKGROUND AND SUMMARY OF THE INVENTION

The invention relates to an injector for introducing, in particular for directly injecting, gaseous fuel into a combustion chamber of an internal combustion engine. The invention also relates to a gas engine having at least one such injector.

DE 10 2017 213 737 A1 discloses an injector for injecting gaseous fuel into a combustion chamber of an internal combustion engine, having an injection body in which a pressure chamber is formed that can be filled with gaseous fuel at an injection pressure and proceeding from which is an injection opening through which the gaseous fuel can exit. A device for spraying a liquid medium should further be taken as known from EP 1 195 203 A2.

The object of the present invention is to create an injector for an internal combustion engine and a gas engine having at least one such injector, so that gaseous fuel can be particularly advantageously introduced into a combustion chamber of the internal combustion engine or of the gas engine by means of the injector.

A first aspect of the invention relates to an injector for introducing, in particular for directly injecting, gaseous fuel, in particular hydrogen, into a combustion chamber of an internal combustion engine, in particular of a motor vehicle. The internal combustion engine can thus be operated in its fired operation by means of the gaseous fuel, such that the internal combustion engine is a gas engine, in particular according to the Otto engine principle, or is also described as a gas engine. During the fired operation of the internal combustion engine, the gaseous fuel is introduced into the combustion chamber, in particular directly injected, by means of the injector, for example within a respective work cycle of the internal combustion engine. For this purpose, the injector comprises a housing that can be flowed through by the gaseous fuel. This should in particular be understood to mean that the gaseous fuel can be or is introduced into the housing and thus into the injector, in particular from outside the housing or the injector as a whole, and can then be or is then removed from the housing and in particular from the injector as a whole again. For example, the gaseous fuel is introduced into the injector, in particular into the housing via at least one introduction opening. Removing the gaseous fuel from the housing or from the injector as a whole is also described as diverting the gaseous fuel out of the housing or out of the injector as a whole. For this purpose, the housing has at least or exactly one outflow opening that can be flowed through by the gaseous fuel flowing through the housing or several outflow openings, via which the gaseous fuel can be removed from the housing, in particular from the injector as a whole, to introduce the gaseous fuel into the combustion chamber and can thus for example be directed into an environment of the housing, in particular of the injector as a whole. In other words, to introduce the gaseous fuel into the combustion chamber, in particular to inject the gaseous fuel directly into the combustion chamber, the gaseous fuel first introduced into the housing or into the injector as a whole is diverted out of or removed from the housing and out of the [injector] in particular as a whole via the outflow opening, also described as an exit opening, and thus directed, i.e., blown, into the environment, in particular directly into the combustion chamber. In other words, the gaseous fuel flowing through the outflow opening exits the housing and the injector as a whole, such that the injector injects or blows the gaseous fuel flowing through the outflow opening out of itself and thus, for example, injects the fuel directly into the combustion chamber.

The injector, in particular the housing, additionally has a valve seat that, for example, is formed, in particular directly, by the housing, in particular by a housing element of the housing. The injector further has a valve element, also simply described as a valve, that can be moved at least or exclusively translationally along a movement direction relative to the housing and relative to the valve seat between a closed position and at least one open position. The closed position is a first position of the valve element. In other words, the closed position is also described as a first position. The open position is a second position of the valve element. In other words, the open position is also described as a second position. The movement direction preferably runs parallel to the longitudinal extension of the valve element and/or the housing. The feature that the valve element can be moved between the positions along the movement direction relative to the housing and relative to the valve seat should in particular be understood to mean that the valve element can be moved back and forth between the positions along the movement direction relative to the housing and relative to the valve seat.

In the closed position, the valve element sits on the valve seat. In other words, in the closed position, the valve element is in support contact with the valve seat, whereby in the closed position, a first housing region of the housing that can be flowed through by the gaseous fuel can be separated by means of the valve element from a second housing region of the housing that can be flowed through by the gaseous fuel and is arranged downstream of the first housing region in the flow direction of the gaseous fuel flowing through the housing. The second housing region comprises the outflow opening here. This means that on its way through the housing and thus for example from the introduction opening to the outflow opening and through the outflow opening, the gaseous fuel first flows through the first housing region and then the second housing region and the outflow opening, the outflow opening for example opening in itself into the second housing region at one end and into or onto the environment of the housing, in particular of the injector as a whole, at the other end. In the completely produced state of the internal combustion engine, the outflow opening opens directly into the combustion chamber at the other end such that the gaseous fuel flowing through the outflow opening and thus out of the injector is injected directly into the combustion chamber.

For example, the valve seat extends around a transfer opening, in particular in the peripheral direction of the housing or the respective housing region running around the movement direction, and most particularly completely surrounding the transfer opening, which is closed and thus locked in the closed position of the valve element by means of the valve element. The housing regions are thus fluidically separated from one another in the closed position by means of the valve element, whereby no gaseous fuel can flow out of the first housing region into the second housing region. Thus, no gaseous fuel flows through the outflow opening in the closed position of the valve element, so that the injector does not provide, i.e., does not blow out, the gaseous fuel in the closed position of the valve element. In other words, the gaseous fuel is prevented from flowing out of the housing, in particular out of the injector as a whole, via the outflow opening due to the housing regions being fluidically separated from each other in the closed position of the valve element by means of the valve element. As the housing regions are fluidically separated from each other in the closed position of the valve element by means of the valve element, the outflow opening is fluidically separated from the first housing region, in particular by means of the valve element, in the closed position of the valve element. The gaseous fuel thus cannot flow from the first housing region to the outflow opening and cannot flow through the outflow opening.

In the open position, the valve element is spaced apart from or raised away from the valve seat, whereby the housing regions are fluidically connected to one another, in particular via the throughflow opening, and the gaseous fuel flowing through the housing regions can be removed from the housing, in particular from the injector as a whole, via the outflow opening. In other words, to introduce the gaseous fuel into the combustion chamber, in particular to inject the fuel directly into the combustion chamber, the valve element is moved from the closed position into the open position. The gaseous fuel can thus flow out of the first housing region into the second housing region, flow through the second housing region and in particular flow through the outflow opening, such that in the open position, the injector can blow out or blows out the gaseous fuel.

To be able to provide the gaseous fuel by means of the injector particularly advantageously, in particular in a manner particularly favorable to flow, i.e., to blow out and thus introduce the fuel into the combustion chamber, it is provided according to the invention that when moved out of the closed position into the open position, the valve element can be moved at least partially into the second housing region. In other words, it is provided that the valve element at least partially moves into the second housing region when it its moved from the closed position into the open position. In other words again, to move the valve element from the closed position into the open position, the valve element is moved relative to the housing, and thus relative to the valve seat at least or exclusively translationally in an opening direction running parallel to the movement direction that points in particular from the first housing region to the second housing region. As at least a part of the valve element is moved into the second housing region when it is moved from the closed position into the open position, at least the part of the valve element is moved out of the second housing region when it is moved out of the open position into the closed position. As the valve element is moved into the second housing region when it is moved from the closed position into the open position, the valve element is also described as an outward-opening valve element, such that the injector is described as an outward-opening injector or an A nozzle or A injector.

It is further provided according to the invention that the valve element has a valve body region arranged in the second housing region in both positions, i.e., both in the closed position and in the open position, and protruding into the second housing region, the valve body region tapering in a direction pointing away from the valve seat, i.e., in the aforementioned opening direction, at least in a partial region of the valve body region, i.e., in particular conically or frustoconically. As an alternative or in addition, the valve body region is domed at least in the partial region. The valve body region is thus a flow guide element or a flow guide geometry, by means of which the gaseous fuel flowing through the housing regions and the outflow opening in the open position of the valve element can be particularly advantageously delivered, in particular in a manner particularly favorable to flow. For example, on its way from the first housing region to the second housing region and through the outflow opening, the gaseous fuel flowing through the housing regions and the flow opening in the open position flows at least over the partial region of the valve body region and/or at least around the partial region of the valve body region and/or along at least the partial region of the valve body region, so that the valve body region or at least the partial region of the valve body region influences the flowing gaseous fuel with regard to its flow. As the valve body region is designed at least in the partial region such that at least the partial region of the valve body region tapers and/or is domed, the valve body region influences the flowing gaseous fuel, i.e., its flow particularly advantageously.

For example, the second housing region is at least partially, in particular at least substantially or completely, delimited or formed, in particular directly, by a housing part of the housing for example designed as one part, wherein the housing element is for example a so-called blowing cap of the housing or a blowing cap region of the housing. The valve element thus moves at least partially into the blowing cap or into the blowing cap region when it is moved from the closed position to the open position. When the blowing cap is mentioned in the following, the blowing cap region should also be understood to be meant and vice versa if not stated otherwise. The invention is thus based on the following information and considerations:

Hydrogen as a gaseous fuel has a lower density than air and thus mixes only poorly in the combustion chamber. To obtain an advantageous mixture formation in particular when directly injecting the hydrogen into the combustion chamber, among other things a targeted generation of a twist and/or tumble current of the gaseous fuel, for example hydrogen, flowing into the combustion chamber is desirable or advantageous, in particular when using an injection impulse in combination with the interaction of a so-called blowing jet with combustion chamber walls of the internal combustion engine delimiting the combustion chamber, in particular directly. The aforementioned blowing jet should in particular be understood as the following: In the open position of the valve element, the injector blows out the gaseous fuel, forming at least or exactly one fuel jet, which is the previously specified blowing jet. In particular, in the open position of the valve element, the injector blows out the gaseous fuel forming several fuel jets also described as blowing jets, in particular if several outflow openings are provided. The impulse can also be increased in the case of a multi-hole blowing cap arranged in the centre of the combustion chamber, which is also advantageous. Again in other words, the gaseous fuel flowing through the outflow opening and out of the housing, in particular of the injector as a whole, via the outflow opening forms the previously specified blowing jet also described as a jet or fuel jet. A first of the previously specified combustion chamber walls is for example a cylinder wall that delimits a cylinder of the internal combustion engine, in particular directly. For example, the cylinder wall is formed by a cylinder housing, designed in particular as a cylinder crankcase, of the internal combustion engine. A second of the combustion chamber walls is for example formed by a piston that is translationally moveably arranged in the cylinder. For example, the second combustion chamber wall is a piston recess of the piston.

The advantageous mixture formation can also be achieved by using several outflow openings also described as blowing holes, and thus by uniform air capture. It is advantageous if the individual jet impulse is as high as possible, in order to generate a sufficiently large jet penetration depth. This is particularly guaranteed by the execution of the valve body according to the invention due to the reduced flow losses.

The blowing cap is a flow region that is arranged under the valve element also described as an injection valve relative to the opening direction and can impress the gaseous fuel flowing through the outflow opening with an advantageous flow, for example an advantageous twist and/or tumble flow, in particular via the outflow opening. The outward-opening valve element is usually designed as a simple poppet valve, the valve body region of which is designed as a simple valve disc. Relative to the latter, a particularly advantageous construction quality of the valve element and in particular of the valve body region is provided by the invention, wherein a so-called blowing cap volume can be kept particularly low by the embodiment of the valve body region according to the invention. The blowing cap volume should be understood as the entire volume or internal volume of the second housing region, in particular with the exception of the outflow opening, for example. As the blowing cap volume can be kept particularly low in the invention, an undesirable damage volume can be reduced in comparison with conventional solutions, flow losses can be reduced, and an undesirable self-combustion in the blowing cap, i.e., in the second housing region, can be prevented. A particularly advantageous jet direction of the blowing jet can additionally be set via the invention.

It is fundamentally conceivable, in particular in the case of injectors for directly injecting hydrogen, to design the valve element as an inward-opening valve element, and thus as an inward-opening needle. The valve element moves away from the second housing region when it is moved from the closed position into the open position, and at least partially into the first housing region. The valve seat would then be located on one end of the blowing cap. However, this can lead to sealing problems due to thermal constrains in the combustion chamber, and in particular during the fired operation of the internal combustion engine, which can be avoided as the valve element is designed as an outward-opening valve element according to the invention. Injectors where the valve element is designed as a simple, outward-opening poppet valve and the second housing region is not present, so that an end of the poppet valve on the combustion chamber side is directly arranged in the combustion chamber and is not surrounded by the blowing cap, generate the blowing jet as an umbrella jet, which is not suitable for generating an advantageous twist and/or tumble flow of the gaseous fuel forming the blowing jet. A simple poppet valve in a blowing cap also causes flow losses, such that a directivity of the jet direction is not guaranteed.

The previously specified problems and disadvantages can be avoided via the invention, as at least the partial region of the valve body region functions as an advantageous flow guide geometry that guides the gaseous fuel flowing through the housing regions and the outflow opening advantageously and in a manner favorable to flow, or advantageously influences the latter with regard to its flow.

Via the embodiment of the valve body region according to the invention, the valve body region or the valve element can in particular receive a particularly large part of the internal volume of the blowing cap or of the second housing region, in particular in its open position, whereby the blowing cap volume can be reduced in relation to conventional solutions. The danger of self-combustion can thus be reduced and the damage volume can be reduced.

By means of the valve body region, the gaseous fuel flowing through the second partial region, i.e., its flow, can be advantageously guided, in particular in the second housing region. In other words, at least the partial region of the valve body region has a particularly advantageous shape, also described as a valve shape, by means of which the gaseous fuel or its flow can advantageously be guided into the second housing region. Excessive dead water chambers and an excessive vortex generation can in particular be prevented. The flow losses of the blowing cap, i.e., in the second housing region can thus be kept particularly low, and when using several overflow openings or overflow holes, influencing can be avoided. Consequently, a particularly high impulse of the fuel jet can be obtained such that a particularly advantageous mixture formation can be represented. The overflow opening or overflow hole should in particular be understood to mean the previously specified outflow opening. The invention further enables a defined flow over the overflow opening or overflow hole, which leads to a particularly advantageous and defined jet direction of the gaseous fuel flowing out of the housing, in particular out of the injector as a whole. An advantageous twist and/or tumble flow of the gaseous fuel flowing out of the housing or out of the injector as a whole into the combustion chamber can thus be obtained. In comparison with conventional solutions, an improvement of the mixture homogenization can thus be obtained, whereby a particularly high specific power of the internal combustion engine can be obtained. A particularly low-emission operation of the internal combustion engine can additionally be obtained.

In a particularly advantageous embodiment of the invention, in the closed position of the valve element, the valve body region takes up at least a third, in particular at least half, of the previously specified and described internal volume of the second housing region, which takes up the internal volume that can be flowed through by the gaseous fuel in the closed position of the valve element. The blowing cap volume in which the valve element is not arranged in the open position can thus be kept particularly low, such that the damage volume can be kept within a particularly low range.

A further embodiment is characterized in that the valve body region is designed rotationally symmetrically in relation to a central axis of the valve body region running in parallel to the movement axis. The gaseous fuel flowing through the housing regions can thus be guided in a manner particularly favorable to flow by means of the valve body region.

In a further, particularly advantageous embodiment of the invention, the valve body region is convex, in particular at least substantially, at least in the partial region, and is thus domed into the second housing region. It can thus be guaranteed that the gaseous fuel is guided in a manner particularly advantageous to flow.

To be able to guide the gaseous fuel particularly advantageously and thus introduce, in particular inject, the fuel into the combustion chamber, it is provided in a further embodiment of the invention that the valve body region is designed in a spherical segment shape at least in the partial region, in particular at least substantially or completely. In a further, particularly advantageous embodiment of the invention, the valve body region is concavely domed at least in the partial region. It can thus be guaranteed that the gaseous fuel is guided in a manner particularly favorable to flow, such that the latter can be particularly advantageously introduced into the combustion chamber.

A further embodiment is characterized in that the tapering partial region of the valve body region ends in particular on a wall of the valve body region forming an end face facing the combustion chamber, the wall of which valve body region extends in a plane running perpendicular to the movement direction. The gaseous fuel can thus be guided in a particularly targeted and defined manner, such that it can be particularly advantageously introduced into the combustion chamber.

In a further, particularly advantageous embodiment of the invention, the valve body region is at least partially, in particular at least substantially or completely, hollow. The weight of the valve element can thus be kept sufficiently low that the valve element can be moved back and forth between the closed position and the open position with a high dynamic, i.e., particularly quickly. The gaseous fuel can thus be introduced into the combustion chamber particularly effectively.

It has finally proved particularly advantageous if the valve seat is circular. It can thus be guaranteed that the gaseous fuel is guided particularly advantageously on its way through the housing.

It has further proved particularly advantageous if the injector has an electrically operated actuator, i.e., an electric actuator, by means of which the valve element can be moved using electrical energy or electrical current from at least one of the positions into one of the other positions respectively. In other words, to move the valve element from the first position into the other position by means of the actuator, the actuator is provided with electrical energy or with electrical current. The gaseous fuel can thus be introduced into the combustion chamber particularly as required. One position is preferably the closed position, such that the other position is preferably the open position.

A second aspect of the invention relates to an internal combustion engine, designed as a gas engine, that has at least one injector according to the first aspect of the invention. Advantages and advantageous embodiments of the first aspect of the invention should be seen as advantages and advantageous embodiments of the second aspect of the invention and vice versa.

Further advantages, features and details of the invention result from the following description of preferred exemplary embodiments and with reference to the drawings. The features and combinations of features specified previously in the description and the features and combinations of features specified in the following description of figures and/or shown in the figures alone can be used not only in the respectively specified combinations, but also in other combinations or in isolation without leaving the scope of the invention.

DETAILED DESCRIPTION OF THE DRAWINGS

Identical or functionally identical elements are provided with the same reference signs in the Figures.

Figure 1:
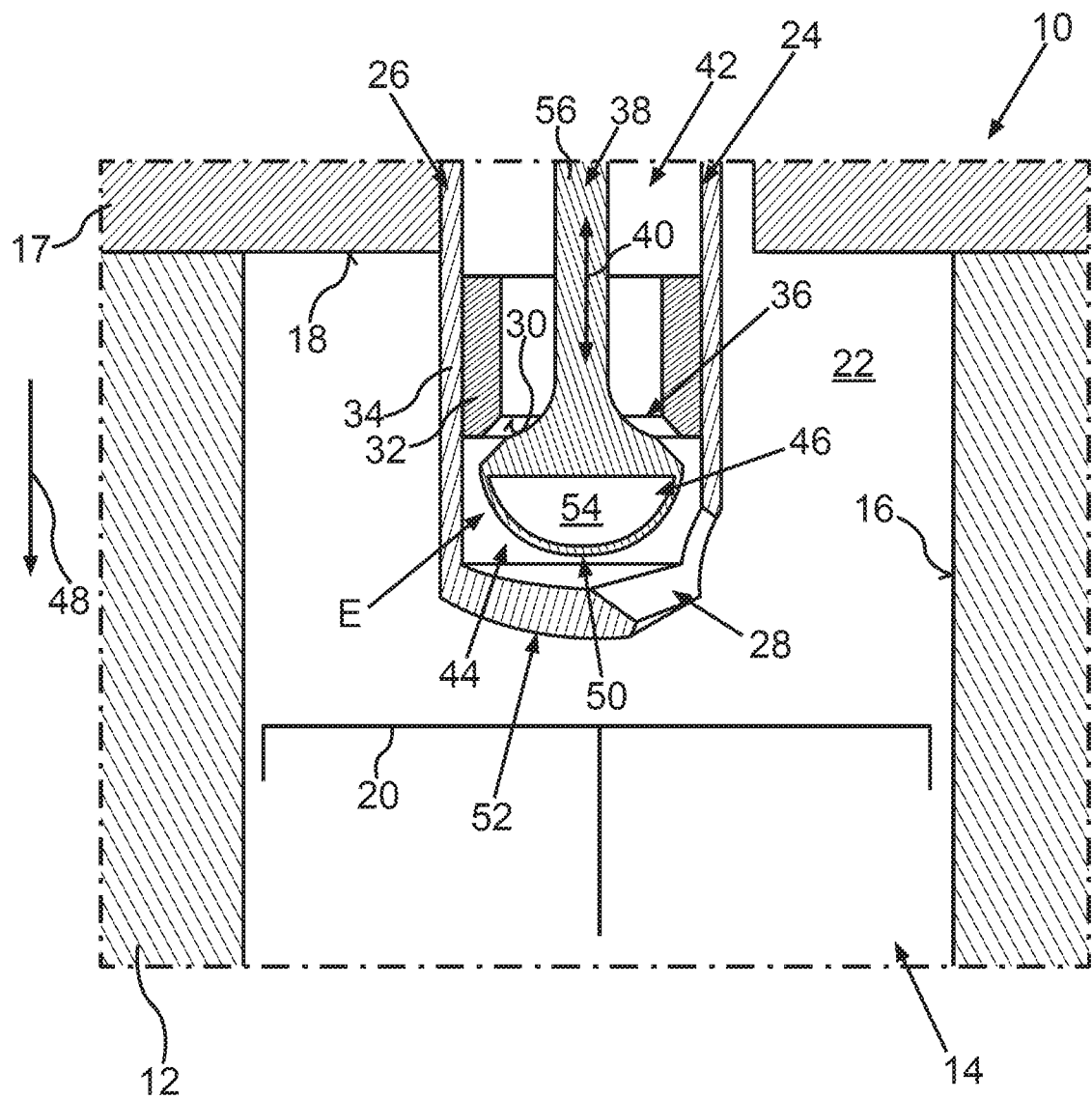
FIG. 1 shows a portion of a schematic sectional view of an internal combustion engine, designed as a gas engine, having an injector according to the invention according to a first embodiment.

FIG. 1 shows a portion of a schematic sectional view of an internal combustion engine 10, designed as a gas engine, that is designed as a reciprocating piston engine or as a reciprocating piston motor. The internal combustion engine 10 is a component of a motor vehicle. This means that the motor vehicle preferably designed as a motor car, in particular as a passenger car or commercial vehicle, has the internal combustion engine and can be driven by means of the internal combustion engine 10 in its fully produced state. The internal combustion engine 10 comprises a cylinder housing 12, preferably designed as a cylinder crankcase, that has, i.e., forms or delimits, at least one cylinder 14. For this purpose, the cylinder housing 12 has a cylinder wall 16 as a first combustion chamber wall, wherein the cylinder 14 is directly delimited and thus formed by the cylinder wall 16. The internal combustion engine 10 comprises a housing element 17 designed separately from the cylinder housing 12 that is for example designed as a cylinder head. The cylinder housing element 17 is connected to the cylinder housing 12. The housing element 17 comprises or forms a combustion chamber roof 18 assigned to the cylinder 14. The internal combustion engine 10 additionally comprises a piston 20 that is translationally moveably received in the cylinder 14. The piston 20, the cylinder 14 and the combustion chamber roof 18 respectively partially delimit a combustion chamber 22 of the internal combustion engine 10, wherein the piston 20, in particular its piston recess, not depicted in FIG. 1, has or forms a second combustion chamber wall partially delimiting the combustion chamber.

During a fired operation of the internal combustion engine 10, combustion processes take place in the combustion chamber 22. In the respective combustion process, a fuel-air mixture, also simply described as a mixture, is burned. The mixture comprises a gaseous fuel that is introduced into the combustion chamber 22. By means of the gaseous fuel, the internal combustion engine 10 is operated in its fired operation. In the exemplary embodiment shown in FIG. 1, the gaseous fuel is blown directly into the combustion chamber 22 within a respective work cycle of the internal combustion engine and thus introduced into the combustion chamber 22. The mixture additionally comprises air that is described as fresh air and is introduced into the combustion chamber 22. An ignition plug is preferably used to ignite the mixture. It is further preferably provided that the internal combustion engine is operated according to the Otto engine principle, i.e., is operated by means of a or of the Otto combustion process.

The internal combustion engine 10 additionally comprises an injector 24 assigned to the combustion chamber 22, by means of which the gaseous fuel can be injected and thus introduced directly into the combustion chamber 22. This means that within the respective work cycle of the internal combustion engine 10, the gaseous fuel is injected directly into the combustion chamber 22 by means of the injector 24, with the formation in particular of at least or exactly one fuel jet also described as a blowing jet and formed by the gaseous fuel flowing out of the injector 24 as a whole and thus flowing into the combustion chamber 22.

In the exemplary embodiment shown in FIG. 1, the internal combustion engine is a hydrogen engine, such that the gaseous fuel is hydrogen. The injector 24 has a housing 26 that can be flowed through by the gaseous fuel (hydrogen), the housing 26 having exactly one outflow opening 28 that can be flowed through by the gaseous fuel and is also described as an overflow opening or blowing hole in the exemplary embodiment shown in FIG. 1. Via the outflow opening 28, the gaseous fuel can be or is removed from the housing 26 to introduce the gaseous fuel, in particular to directly inject the gaseous fuel, into the combustion chamber 22. For example, the outflow opening 28 is designed as a hole, such that the outflow opening 28 is also described as an outflow hole or overflow hole. It can be recognized that the gaseous fuel flowing through the housing 26 can be removed from the housing 26 and from the injector 24 as a whole via the outflow opening 28 and can thus be injected directly into the combustion chamber 22. The injector 24, in particular the housing 26, also has a valve seat 30. In the exemplary embodiment shown in FIG. 1, the valve seat 30 is formed by the housing 26. In particular, the valve seat 30 is formed by a first housing element 32 of the housing 26. It is conceivable that the housing 26 has a second housing element 34 that is, for example, designed separately from the housing element 32 and is connected to the housing element 32. In particular, the housing elements 32 and 34 are connected to each other in such a way that the housing elements 32 and 34 are fixed to each other, and thus that relative movements between the housing elements 32 and 34 are avoided. The housing 26, in particular the housing element 32, has a throughflow opening 36, also described as a through opening, around which the valve seat 30 extends, completely surrounding, in the peripheral direction of the housing 26 and thus in the peripheral direction of the throughflow opening 36. In the exemplary embodiment shown in FIG. 1, the valve seat 30 and thus the throughflow opening 36 are circular.

The injector 24 also has a valve element 38, simply described as a valve, that can be moved between a closed position and at least or exactly one open position shown in FIG. 1 at least or exclusively translationally along a movement direction depicted by a double arrow 40 in FIG. 1 relative to the housing 26 and thus relative to the housing elements 32 and 34 and relative to the valve seat 30. The closed position is also described as a first position, wherein the open position is described as a second position.

It can be seen that the housing 26 has a first housing region 42 and a second housing region 44, wherein the housing regions 42 and 44 can be flowed through by the gaseous fuel flowing through the housing 26. Relative to the movement direction and when viewed from the combustion chamber 22, the housing region 42 is arranged beyond the valve seat 30 or the throughflow opening 36, wherein the housing region 44 is arranged on this side of the valve seat 30 or the through flow opening 36. In the closed position, the valve element 38, in particular a valve body 46 of the valve element 38, sits on the valve seat 30, whereby the throughflow opening 36 is fluidically locked by means of the valve element 38, in particular by means of the valve body 46, whereby the housing regions 42 and 44 are fluidically separated from one another. It can be seen that the housing region 44 has the outflow opening 28. This should in particular be understood to mean that the outflow opening 28 opens on one side or one end into or onto an environment of the injector 24 as a whole and thus into the combustion chamber 22. On the other side or other end, the outflow opening 28 opens into the housing 26 and into the housing region 44. The outflow opening 28 is thus fluidically separated from the housing region 42 in the closed position of the valve element 38 by means of the valve element 38, wherein the housing region 44 is arranged downstream of the housing region 42 in the flow direction of the gaseous fuel flowing through the housing 26 and thus through the housing regions 42 and 44. In the closed position of the valve element 38, the gaseous fuel thus cannot flow from the housing region 42 into the housing region 44 and thus cannot flow through the outflow opening 28, such that in the closed position of the valve element 38, the gaseous fuel is prevented from flowing out of the housing 26 and in particular out of the injector 24 as a whole. An introduction, in particular injection caused by the injector 24 of the gaseous fuel into the combustion chamber 22 is thus prevented in the closed position.

In the open position, however, the valve element 38 releases the throughflow opening 36 so that in the open position of the valve element 38, the housing regions 42 and 44 are fluidically connected to each other via the throughflow opening 36. In the open position of the valve element 38, the gaseous fuel can thus flow through the housing regions 42 and 44 and through the outflow opening 28, such that in the open position of the valve element 38, the injector 24 blows out or can blow out the gaseous fuel. The gaseous fuel is thus injected directly into the combustion chamber 22 by means of the injector 24. In other words, in the open position of the valve element 38, the gaseous fuel flowing through the housing regions 42 and 44 can be removed from the housing 26 and from the injector 24 as a whole via the outflow opening 48.

FIG. 1 shows a first embodiment of the injector 24. To be able to guide the gaseous fuel in a manner particularly favorable to flow and thus to be able to introduce the fuel into the combustion chamber 22 particularly advantageously, in particular in the open position of the valve element 38, in the first embodiment it is provided that the valve element 38 can be at least partially moved into the second housing region 44 when it is moved from the closed position into the open position. In other words, to move the valve element 38 from the closed position into the open position, the valve element 38 is moved relative to the housing 26 and thus relative to the valve seat 30 at least or exclusively translationally in an opening direction running parallel to the movement direction and depicted by an arrow 48 in FIG. 1, wherein the opening direction in particular points from the housing region 42 to the housing region 44. The valve element 38 is thus an outward-opening valve element 38, wherein however the valve element 38, in particular its end region E in the combustion chamber in particular formed by the valve body 46 is arranged in both positions within the housing 26 and is arranged in the second housing region 44. In the first embodiment, it is additionally provided that the valve element 38 has a valve body region 50 arranged in the second housing region 44 in both positions and formed by the valve body 46, the valve body region being domed at least in a partial region, in particular at least substantially and thus at least more than half or completely in the second embodiment. In the first embodiment, the valve body region 50 is convexly domed and thus bulges into the second housing region 44, wherein the valve body region 50 is designed in a spherical segment shape.

In the closed position of the valve element 38, the second housing region 44 has an internal volume that can be flowed through by the gaseous fuel, wherein the valve body region 50 takes up at least a third, in particular at least half, of the internal volume of the second housing region 44 in the closed position. A damage volume can thus be kept particularly low.

Injector concepts with inward-opening or outward-opening nozzle needles are known. In both injector concepts, however, a high closing force is applied by a hydraulic system in order to keep leakage as low as possible. Electrically controlled or operated injectors cannot obtain this high closing force, so that the valve seat 30 must particularly be protected against roughness and thermal warping. This is possible as the valve seat 30 is arranged in the housing 26. The housing region 44 is at least partially, in particular at least substantially and thus more than half and particularly preferably completely, delimited or formed, in particular directly, by a blowing cap region 52 of the housing 26, also described as a blowing cap. For example, the blowing cap region 52 is formed or delimited by the housing element 34, which can be formed as one part. The blowing cap, and thus the blowing cap region 52, is used to form the jet, i.e., to form the previously specified fuel jet (blowing jet). For this purpose, the blowing cap has the exactly one outflow opening 28 which can impress a shape on the gaseous fuel flowing through the outflow opening 28 or the fuel jet formed by the gaseous fuel. It is conceivable that the injector 24, in particular the blowing cap, has several outflow openings 28, for example designed as holes. As the valve body region 50 is arranged in the housing region 44 in both positions, the valve body region 50 or the valve element 38 is set back in relation to the outflow opening 28 and thus into the housing 26. An excessive, in particular thermal, load of the valve seat 30 can thus be avoided.

The injector 24 is preferably an electrically controlled and electrically operated injector. This means that an electrically operated actuator is preferably provided by means of which the valve element 38 can be moved out of at least one of the positions into the other position using electrical energy or electrical current.

The design usually results in a comparatively large blowing cap chamber, by which is understood the previously specified internal volume of the housing region 44. The blowing cap chamber represents a volume that is separated or delimited from the actual combustion chamber 22 up to the outflow opening 28 or up to the outflow openings. The possibility of a so-called "burn out" of flames from the combustion chamber 22 into the blowing cap chamber (housing region 44) usually arises in particular if the outflow opening 28 is designed to be large. Increases of a temperature in the blowing cap chamber relative to the combustion chamber 22 are additionally possible due to exposed walls of the blowing cap in the combustion chamber 22. This poses the danger of self-combustion in the blowing cap chamber. During the injection of the gaseous fuel, large velocity curves result in the blowing cap chamber, which can partially lead to parasitic vortex structures.

To avoid the previously specified disadvantages and problems, the valve body region 50 is provided as an in particular convexly domed structure in the first embodiment. The valve body region 50 thus functions as a jet formation cap, by means of which the gaseous fuel can be directed particularly advantageously and in a manner favorable to flow. In the open position, the gaseous fuel flows through the housing regions 42 and 44, wherein the gaseous fuel flows over and flows around the valve body region 50. Due to the corresponding embodiment of the valve body region 50, the gaseous fuel can thus be directed in a manner particularly favorable to flow. The valve element 38 is thus not designed as a simple poppet valve having a simple valve disc as a valve body 46, and instead the valve body 46 or its valve body region 50 is designed in the first embodiment in a spherical segment shape and thus as a domed structure. In comparison with conventional solutions, the valve body 46 or the valve body region 50 is thus a jet forming cap optimized for flow, which reduces the free volume in the blowing cap chamber significantly in comparison with conventional solutions and leads to an advantageously directed flow of gaseous fuel through the remaining blowing cap chamber. Due to the significantly increased ratio of surface to volume of the valve body region 50 in comparison with conventional solutions, hot spots in the blowing cap chamber are avoided, whereby the danger of self-combustion in the blowing cap chamber is reduced in comparison with conventional solutions. In comparison with conventional solutions, the valve element 38 is extended into the blowing cap below a valve disc provided in the conventional manner so as to optimize flow, and thus protruding into the housing region 44, in order to thereby define the gaseous fuel or its flow into the blowing cap and simultaneously to reduce the in particular free blowing cap volume. The free blowing cap volume should in particular be understood as the volume at which the valve element 38 is not arranged in the open position.

The directed flow through the blowing cap chamber also enables the design of the jet direction into the combustion chamber 22, in particular with regard to the jet directivity. By using several outflow openings, interactions between the outflow openings due to vortices are reduced or avoided, whereby an advantageously more uniform jet pattern is generated.

To keep the weight of the valve element 38, also described as an injection valve, particularly low and thus to be able to ensure sufficiently high dynamics of the valve element 38, it can be provided that the valve body region 50 or the valve body 46 is designed to be hollow. In the first embodiment, the valve body 46 thus has a cavity 54 in its interior. The valve element 38 comprises the valve body 46 and a shaft 56. The shaft 56 and the valve body 46 can be designed as one part with one another. In particular if the valve body 46 is designed to be hollow, it can be advantageous if the shaft 56 and the valve body 46 are designed as components formed separately from each other and connected to each other. For example, the valve body 46 and thus the valve body region 50 is connected to the shaft 56 or to an injection valve blank via welding, in particular via laser welding.

Figure 2:
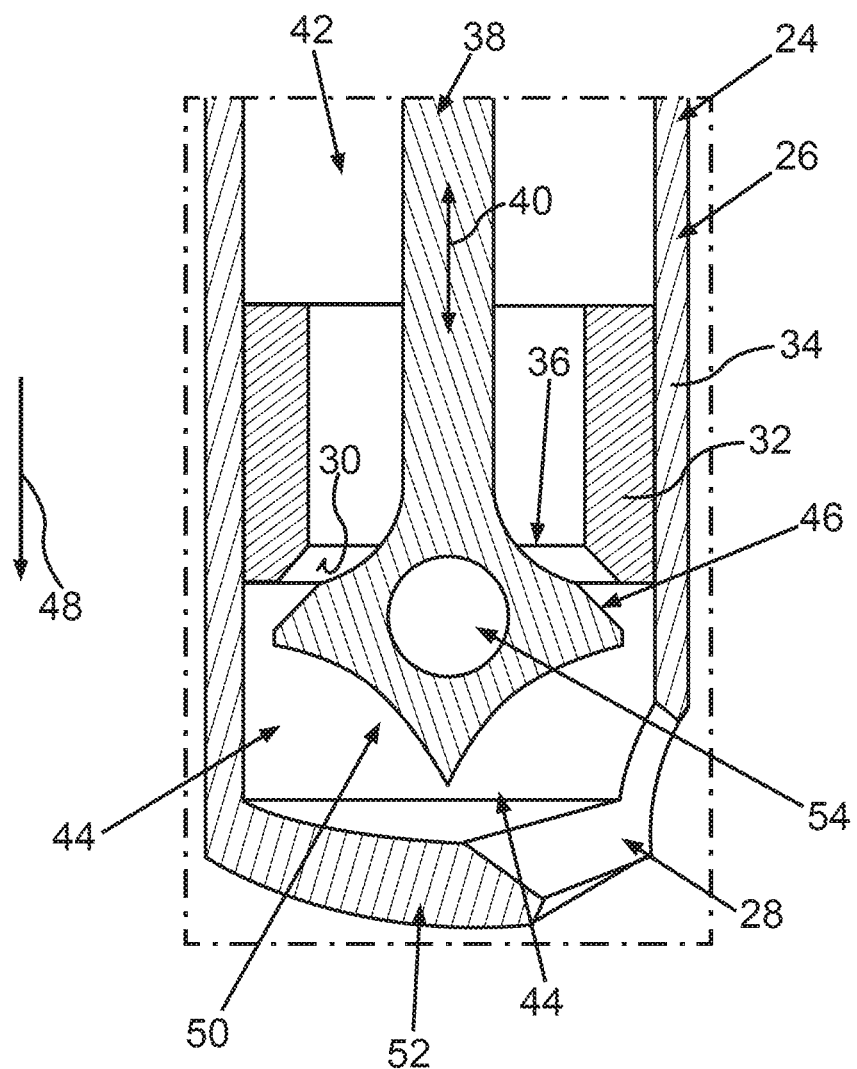
FIG. 2 shows a portion of a schematic sectional view of the injector according to a second embodiment.

FIG. 2 shows a second embodiment of the injector 24. In the second embodiment, the valve body region 50 is convex and thus domed away from the housing region 44, wherein the valve body region 50 can also be spherical segment-shaped.

Figure 3:
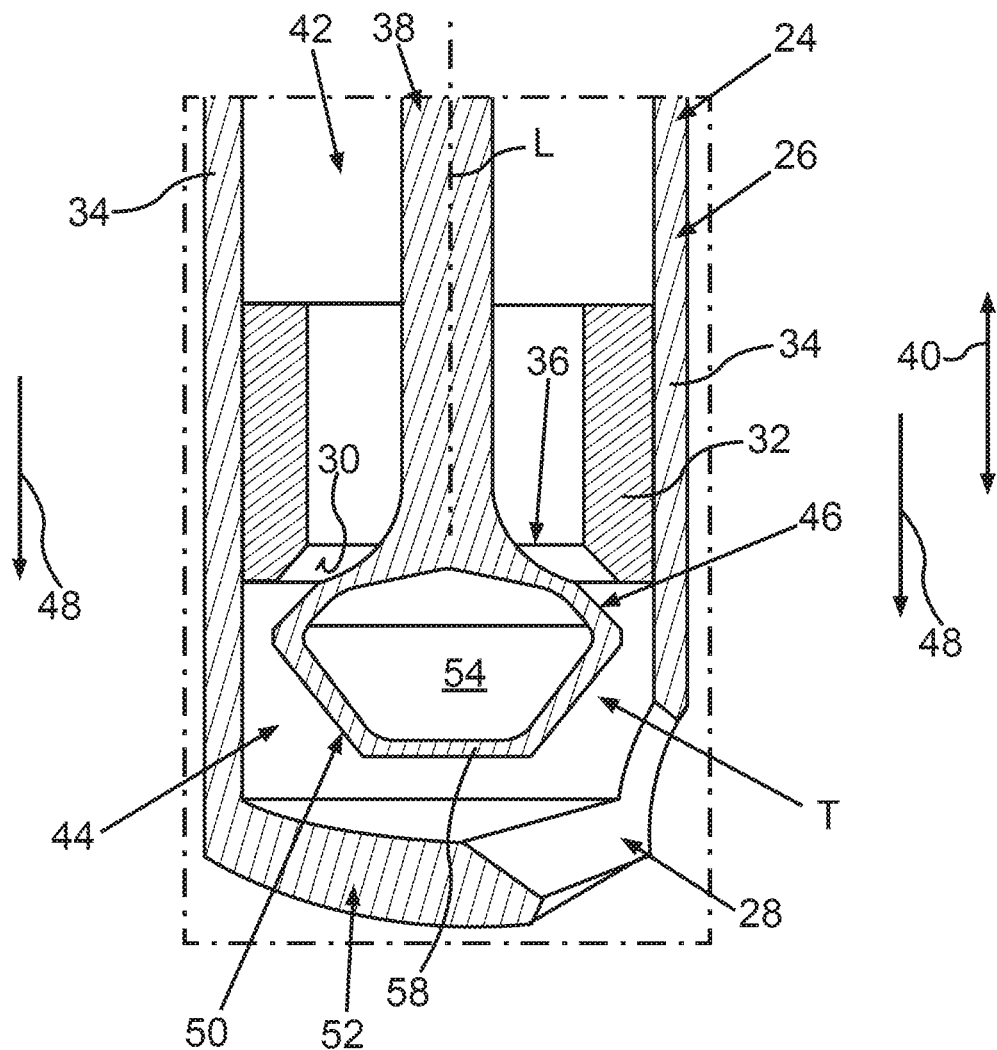
FIG. 3 shows a portion of a schematic sectional view of the injector according to a third embodiment.

FIG. 3 shows a third embodiment of the injector 24. In the third embodiment, the valve body region 50 is designed to be conical or frustoconical such that the valve body region 50 tapers in a direction pointing away from the valve seat 30 and thus in the opening direction depicted by the arrow 48, in particular continuously or successively. The partial region T of the valve body region 50 tapers in the opening direction, wherein the partial region T of the valve body region 50 tapering in the opening direction ends on a wall 58 of the valve body region 50, of which the wall 58 runs in a plane that extends perpendicular to the movement direction. The wall 58 is designed flat when viewed outwards or in the opening direction. Furthermore, it is provided in all three embodiments that the valve body region 50 is designed rotationally symmetrically in relation to a longitudinal central axis L running in parallel to the movement direction or coinciding with the movement direction. The gaseous fuel can thus be directed in a manner particularly favorable to flow.

Figure 4:
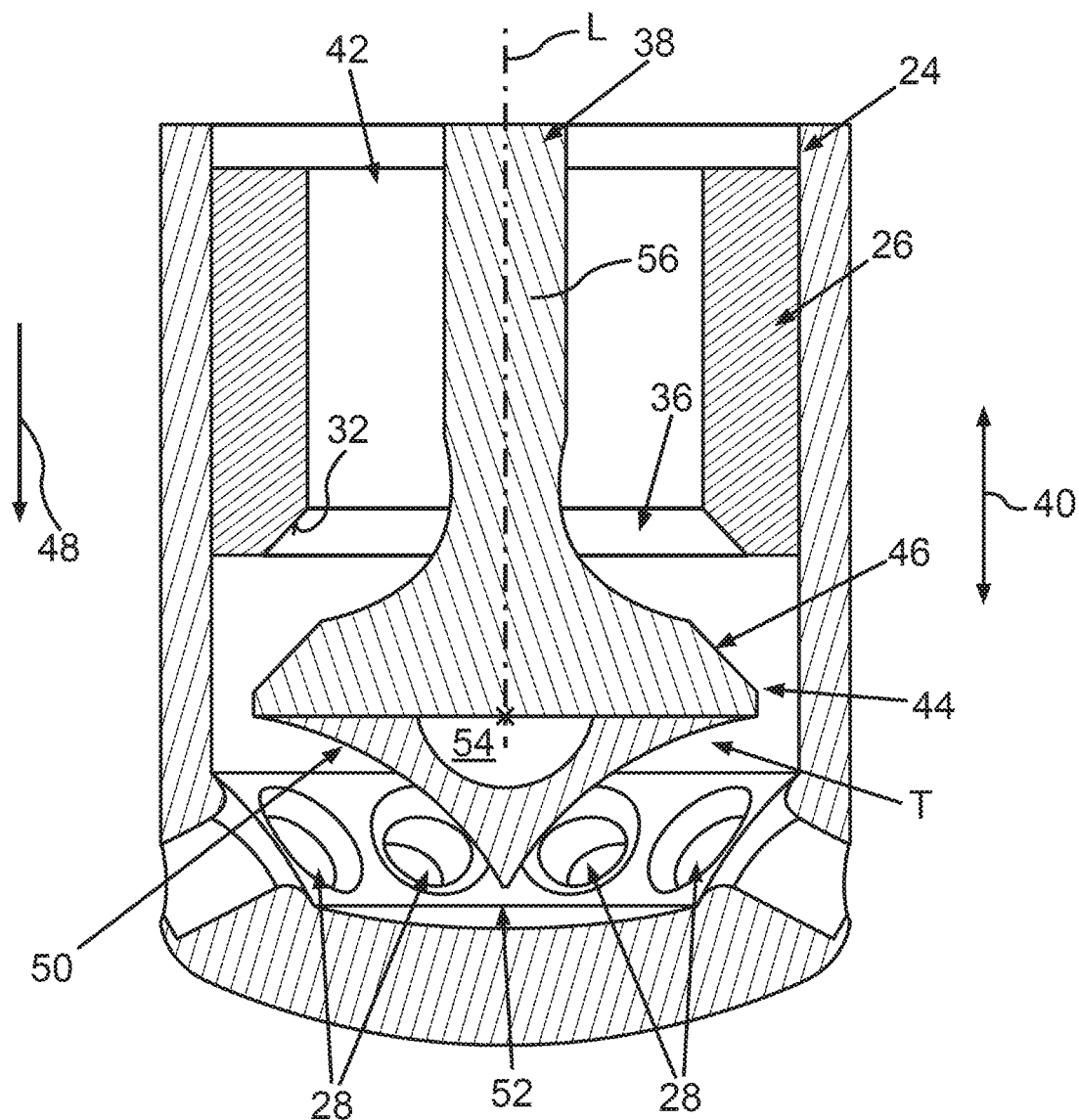
FIG. 4 shows a portion of a schematic sectional view of the injector according to a fourth embodiment.

FIG. 4 shows the injector 24 according to a fourth embodiment in a schematic sectional view. The injector 24 has several, for example at least or exactly 10 or a number differing from 10, outflow openings 28. This means that the following and previous embodiments are valid and advantageous both for blowing caps having exactly one outflow opening 28, also described as an overflow opening, and for blowing caps having several overflow openings. An optimization of the dead water chamber in the blowing cap chamber can thus be achieved.

LIST OF REFERENCE CHARACTERS 10 internal combustion engine
12 cylinder housing
14 cylinder
16 cylinder wall
17 housing element
18 combustion chamber roof
20 piston
22 combustion chamber
24 injector
26 housing
28 outflow opening
30 valve seat
32 housing element
34 housing element
36 throughflow opening
38 valve element
40 double arrow
42 first housing region
44 second housing region
46 valve body
48 arrow
50 valve body region
52 blowing cap region
54 cavity
56 shaft
58 wall
E end region
L longitudinal central axis
T partial region

The invention claimed is:

1. An injector (24) for introducing a gaseous fuel into a combustion chamber (22) of an internal combustion engine (10), comprising:
a housing (26) that can be flowed through by the gaseous fuel, wherein the housing (26) has a blowing cap (52) with an outflow opening (28) that can be flowed through by the gaseous fuel and via which the gaseous fuel can be removed from the housing (26) to introduce the gaseous fuel into the combustion chamber (22);
a valve seat (30); and
a valve element (38) that can be moved at least translationally along a movement direction (40) relative to the housing (26) and relative to the valve seat (30) between:
a closed position as a first position, in which the valve element (38) sits on the valve seat (30) and separates a first housing region (42) of the housing (26) that can be flowed through by the gaseous fuel from a second housing region (44) of the housing (26) that can be flowed through by the gaseous fuel, wherein the second housing region (44) is disposed downstream of the first housing region (42) in a flow direction of the gaseous fuel when flowing through housing (26) and has the outflow opening (28), wherein in the closed position the gaseous fuel is prevented from flowing out of the housing (26) via the outflow opening (28); and
an open position as a second position, in which the valve element (38) is spaced apart from the valve seat (30) such that the first housing region (42) and the second housing region (44) are fluidically connected to one another and the gaseous fuel when flowing through the first housing region (42) and the second housing region (44) can be removed from the housing (26) via the outflow opening (28);
wherein when moved out of the closed position into the open position, the valve element (38) can be moved at least partially into the second housing region (44);
wherein the valve element (38) has a valve body region (50) that is disposed in the second housing region (44) in both the first position and the second position; and
wherein the valve body region (50) is domed at least in a partial region (T) of the valve body region (50) and/or is tapered in a direction pointing away from the valve seat (30).

2. The injector (24) according to claim 1, wherein, in the closed position of the valve element (38), the second housing region (44) has an internal volume that can be flowed through by the gaseous fuel and wherein the valve body region (50) takes up at least a third of the internal volume of the second housing region (44) in the closed position.

3. The injector (24) according to claim 1, wherein the valve body region (50) is rotationally symmetric in relation to a central axis (L) of the valve body region (50) running parallel to the movement direction (40).

4. The injector (24) according to claim 1, wherein the valve body region (50) is domed such that the valve body region (50) is convex at least in the partial region (T).

5. The injector (24) according to claim 1, wherein the valve body region (50) has a spherical segment shape at least in the partial region (T).

6. The injector (24) according to claim 1, wherein the valve body region (50) is concavely domed at least in the partial region (T).

7. The injector (24) according to claim 1, wherein the tapered valve body region (50) ends on a wall (58) of the valve body region (50) and wherein the wall (58) extends in a plane running perpendicular to the movement direction (40).

8. The injector (24) according to claim 1, wherein the valve body region (50) is at least partially hollow.

9. The injector (24) according to claim 1, wherein the valve seat (30) is circular.

10. A gas engine (10), comprising:
the injector (24) according to claim 1.

* * * * *